(12) United States Patent
Istok et al.

(10) Patent No.: US 10,718,145 B2
(45) Date of Patent: Jul. 21, 2020

(54) VISCOUS DAMPER WITH INTEGRAL SPRING

(71) Applicant: FORD GLOBAL TECHNOLOGIES, LLC, Dearborn, MI (US)

(72) Inventors: Michael Istok, Macomb, MI (US); Anna Miller Hill, Belleville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 334 days.

(21) Appl. No.: 15/378,846

(22) Filed: Dec. 14, 2016

(65) Prior Publication Data

US 2018/0163449 A1    Jun. 14, 2018

(51) Int. Cl.
| E05F 1/10 | (2006.01) |
| E05F 3/14 | (2006.01) |
| E05F 3/20 | (2006.01) |
| B60R 7/04 | (2006.01) |

(52) U.S. Cl.
CPC ............... E05F 3/14 (2013.01); B60R 7/04 (2013.01); E05F 1/1008 (2013.01); E05F 3/20 (2013.01); *E05Y 2201/484* (2013.01); *E05Y 2900/538* (2013.01)

(58) Field of Classification Search
CPC ...... E05F 3/14; E05F 3/20; B60R 7/04; E05Y 2900/538
See application file for complete search history.

(56) References Cited

U.S. PATENT DOCUMENTS

| 5,211,267 A * | 5/1993 | Clark ................. F16D 57/00 16/82 |
| 5,713,623 A * | 2/1998 | Mattingly ............ B60R 7/04 16/337 |
| 6,062,623 A * | 5/2000 | Lemmen ............. B60R 7/04 224/282 |
| 6,415,674 B1 * | 7/2002 | Davis ................. F16H 55/18 74/409 |
| 6,422,524 B1 * | 7/2002 | Spagnuolo ........... B60R 7/10 248/307 |
| 7,192,072 B2 * | 3/2007 | Schmidt .............. B60R 7/06 296/37.12 |
| 7,661,741 B2 * | 2/2010 | Takai .................. B60R 7/04 296/37.1 |
| 8,307,505 B2 * | 11/2012 | Harada ................ B60R 7/06 16/293 |

(Continued)

FOREIGN PATENT DOCUMENTS

| DE | 202017107579 U1 * | 1/2018 | ............... B60R 7/04 |
| GB | 2288450 B | 11/1997 | |

(Continued)

OTHER PUBLICATIONS

English Machine Translation of JP2002250388A.
English Machine Translation of JP2004345441A.

*Primary Examiner* — Jerry E Redman
(74) *Attorney, Agent, or Firm* — David Coppiellie; King & Schickli, PLLC

(57) ABSTRACT

A viscous damper includes a damper housing and a shaft extending through the damper housing. The shaft includes a first exposed end and a second exposed end. A gear is mated to the first exposed end of the shaft. A spring is connected to the second exposed end of the shaft. A storage bin is also disclosed.

12 Claims, 8 Drawing Sheets

(56) References Cited

U.S. PATENT DOCUMENTS

| | | | |
|---|---|---|---|
| 8,770,515 B1* | 7/2014 | Cloud | G05G 17/00 |
| | | | 244/118.5 |
| 9,073,494 B1 | 7/2015 | Clark et al. | |
| 9,272,668 B2* | 3/2016 | Suzuki | B60R 7/04 |
| 9,321,403 B1* | 4/2016 | Nedelman | B60R 7/04 |
| 2007/0013202 A1* | 1/2007 | Tompson | B60R 7/04 |
| | | | 296/37.1 |
| 2007/0045332 A1* | 3/2007 | Kikuchi | B60R 7/04 |
| | | | 220/830 |
| 2008/0152181 A1* | 6/2008 | Parker | H04R 1/2857 |
| | | | 381/345 |
| 2009/0115115 A1* | 5/2009 | Zeilenga | E05F 5/00 |
| | | | 267/69 |
| 2011/0296938 A1* | 12/2011 | Doornbos | F16F 9/12 |
| | | | 74/411.5 |
| 2016/0199685 A1* | 7/2016 | von Hoffmann | A63B 21/4025 |
| | | | 482/8 |
| 2017/0293253 A1* | 10/2017 | Iwase | G03G 21/1633 |
| 2018/0035612 A1* | 2/2018 | Jones | A01F 15/0883 |
| 2018/0128359 A1* | 5/2018 | Fida | F16H 33/02 |

FOREIGN PATENT DOCUMENTS

| | | |
|---|---|---|
| JP | 2002250388 A | 9/2002 |
| JP | 2004345441 A | 12/2004 |

* cited by examiner

VISCOUS DAMPER WITH INTEGRAL SPRING

TECHNICAL FIELD

This document relates generally to the motor vehicle equipment field and, more particularly, to a viscous damper having an integral spring as well as to a storage bin incorporating a door and that viscous damper.

BACKGROUND

Storage bins for motor vehicles and other applications are often provided with an individual spring to provide the force for opening the bin door and an individual damper to provide for smooth, even and consistent movement as the spring biases the door from the closed position to the open position.

Unfortunately, the combination of individual springs and dampers often leads to uneven flushes of the bin door to the surrounding housing. This is often due to the fact that the spring load is not uniform across the entire door. In addition, individual springs are easy to misinstall in terms of orientation as well as proper "locking" of the spring in location. Still further, the anchor points for the spring need to be robust to allow for the desired amount of spring tension. Consequently, a typical design has a limited amount of ability to increase the spring constant before the housing needs to be redesigned.

This document relates to a new and improved viscous damper having an integrated spring. Advantageously, that integrated spring is external to the damper housing. The external mounting of the integrated spring allows for proper "clocking" of the coil spring to the damper so that the required compartment door force freeload is provided. Adjustability of the coil spring preload is also enhanced. Further, it is easier to change a coil spring for increase/decrease of door cycle time. Still further, coil spring size, material, wire gauge and number of coils as well as coatings are not limited to the internal package size of the damper housing. Accordingly, there is more design flexibility allowing the viscous damper to be utilized for a greater number of potential applications.

SUMMARY

In accordance with the purposes and benefits described herein, a viscous damper is provided. That viscous damper comprises a damper housing and a shaft extending through the damper housing. That shaft includes a first exposed end and a second exposed end. The viscous damper also includes a gear mated to the first exposed end of the shaft and a spring connected to the second exposed end of the shaft.

The spring may be a coil spring. That coil spring may be concentrically received over the shaft. Further, that coil spring may have a first spring end engaged in a first receiver in the second exposed end of the shaft. The viscous damper may also include a mounting boss that supports the damper housing. That mounting boss may include a second receiver through which the spring extends. Further, the mounting boss may include a first abutment and a second abutment. The damper housing may include a first mounting lug in engagement with the first abutment and a second mounting lug in engagement with the second abutment so that the damper housing is secured to the mounting boss.

In addition, the mounting boss may include a spring retainer. In such an embodiment, the coil spring may include a second spring end engaged with the spring retainer. In addition, the viscous damper may include a damping feature. The damper feature provides the damping function to the gear of the viscous damper. In one possible embodiment, the damper feature comprises a plurality of vanes attached to the shaft rotating through a viscous fluid held in the sealed damper housing.

In accordance with an additional aspect, a storage bin is provided. That storage bin comprises a door and a viscous damper connected to the door. That viscous damper includes (a) a damper housing, (b) a shaft extending through the damper housing where that shaft includes a first exposed end and a second exposed end, (c) a gear mated to the first exposed end of the shaft and (d) a spring connected to the second exposed end of the shaft.

The spring may be a coil spring. That coil spring may be concentrically received over the shaft. Further, that coil spring may have a first end engaged in a first receiver in the second exposed end of the shaft.

The storage bin may also include a mounting boss supporting the damper housing. That mounting boss may include a second receiver through which the spring extends. In addition, the mounting boss may include a first abutment and a second abutment. The damper housing may include a first mounting lug in engagement with the first abutment and a second mounting lug in engagement with the second abutment.

The mounting boss may also include a spring retainer and the coil spring may include a second spring end engaged with that spring retainer.

The storage bin may also include a damping feature in the damper housing. Further, the storage bin may include a second gear fixed to the door. The second gear may be aligned with a pivot axis for the door and may mesh with the gear of the viscous damper which is mated to the first exposed end of the shaft.

In the following description, there are shown and described several preferred embodiments of the viscous damper and the storage bin incorporating the viscous damper. As it should be realized, the viscous damper and the storage bin are capable of other, different embodiments and their several details are capable of modification in various, obvious aspects all without departing from the viscous damper and storage bin as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the viscous damper and storage bin and together with the description serve to explain certain principles thereof.

Figure 1:
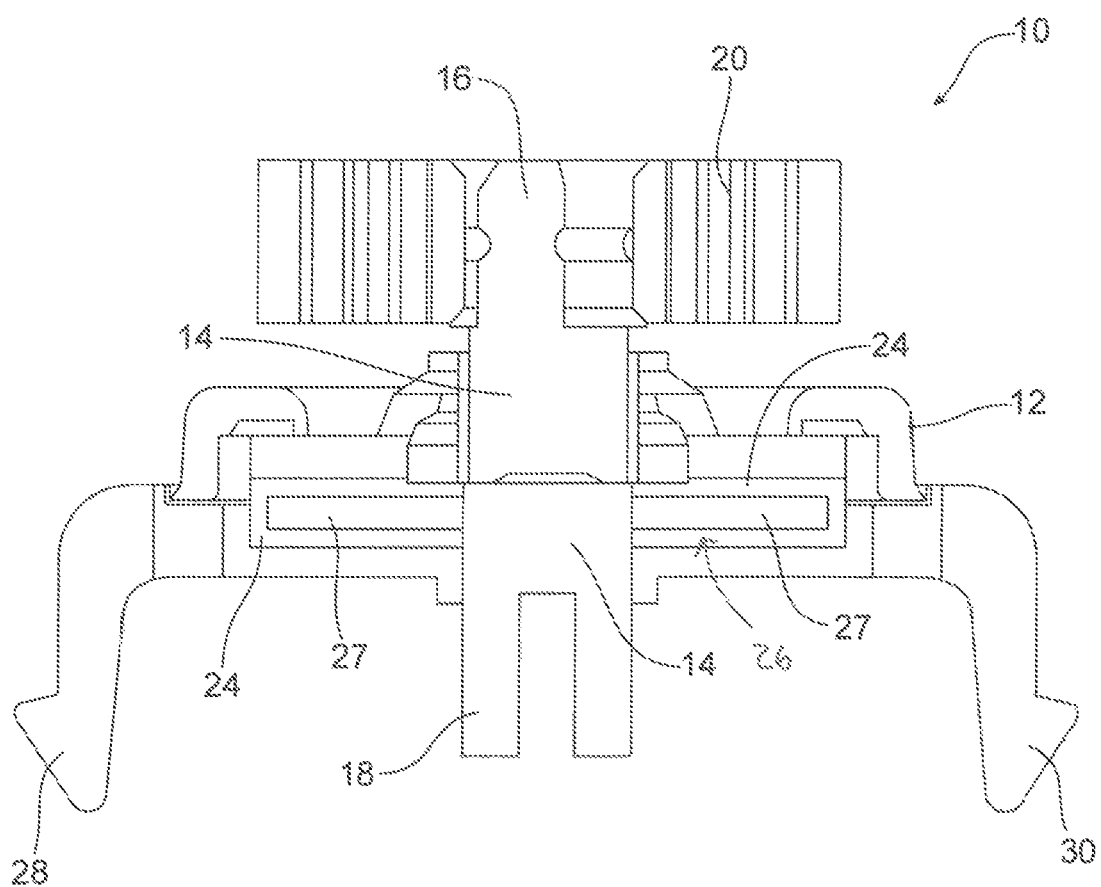
FIG. 1 is a detailed cross-sectional view of the viscous damper.
Figure 2:
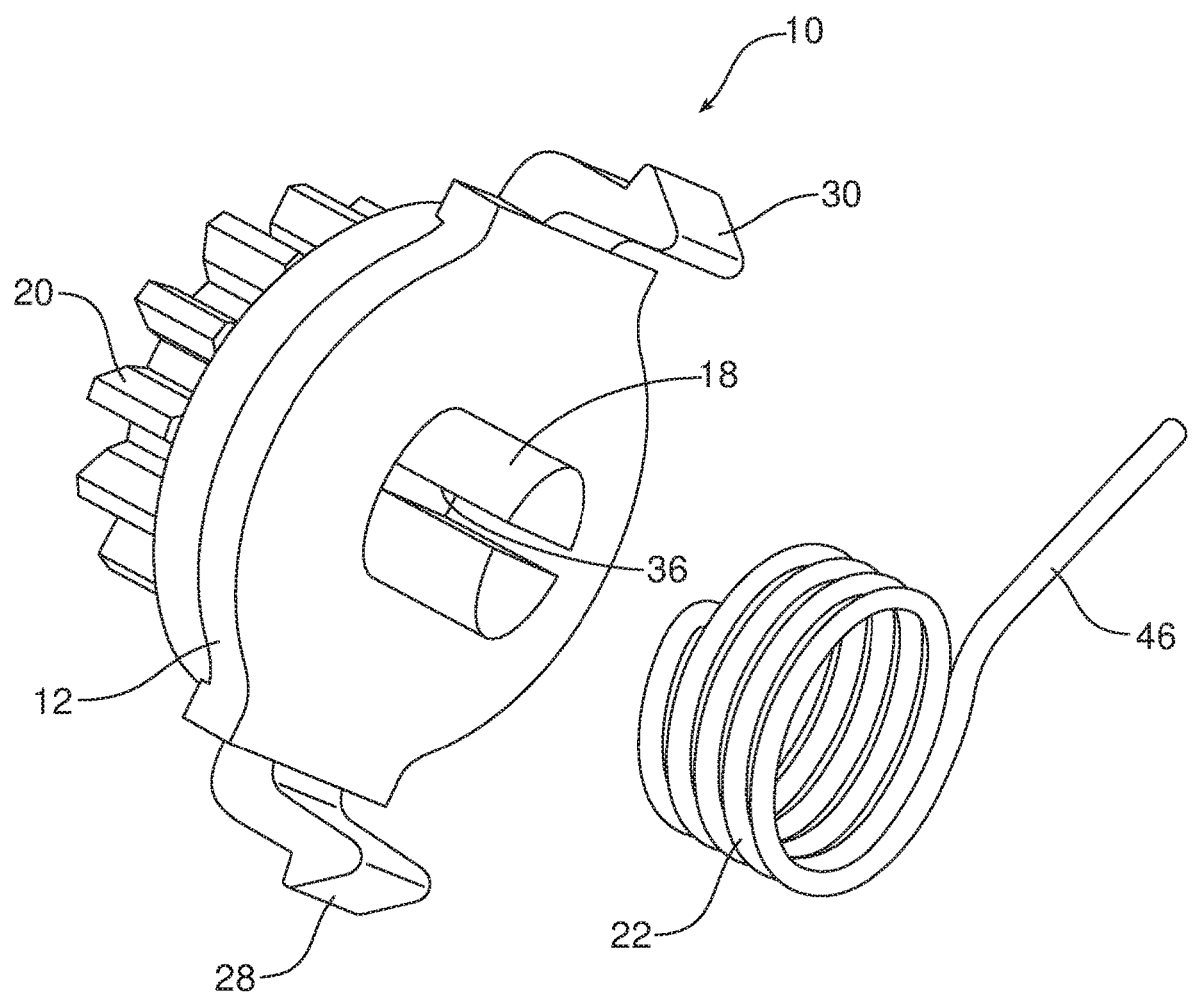
FIG. 2 is a detailed and partially-exploded perspective view of the viscous damper illustrated in FIG. 1.
Figure 3:
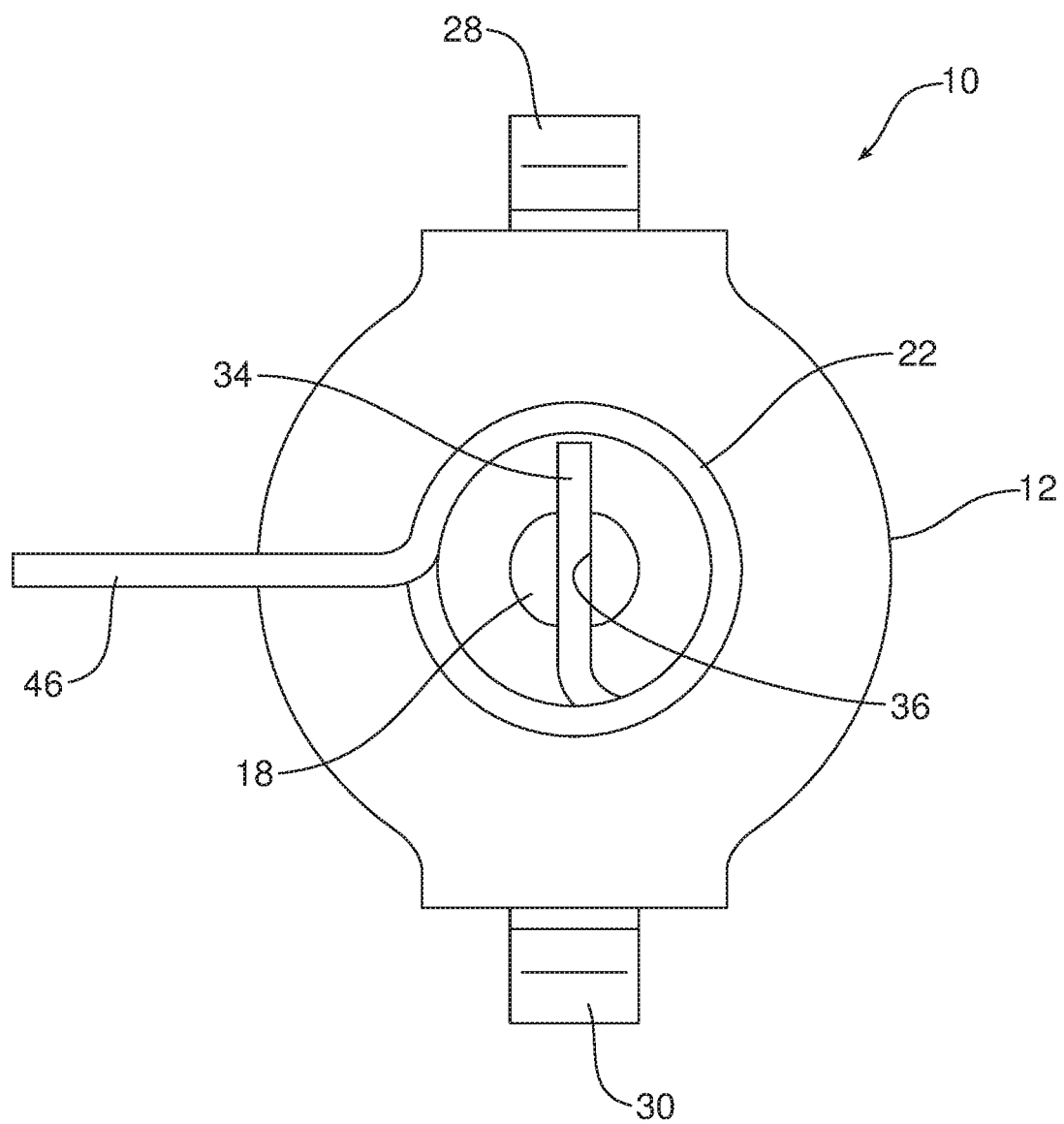
FIG. 3 is a detailed rear elevational view of the viscous damper illustrated in FIGS. 1 and 2 showing how the first spring end is engaged in a first receiver in the second exposed end of the shaft of the viscous damper.

Reference will now be made in detail to the present preferred embodiments of the viscous damper and storage bin, examples of which are illustrated in the accompanying drawing figures.

DETAILED DESCRIPTION

Reference is now made to FIGS. 1-4 illustrating the new and improved viscous damper 10. The viscous damper 10 includes a damper housing 12 and a shaft 14 extending through the damper housing. The shaft 14 includes a first exposed end 16 and a second exposed end 18. A gear 20 is mated to the first exposed end 16. A spring 22 is connected to the second exposed end 18 (no spring shown in FIG. 1).

More specifically, the damper housing 12 includes an internal cavity 24 that receives and holds a damping feature 26. In the illustrated embodiment, the damping feature 26 comprises a plurality of vanes 27 carried on the shaft 14 rotating through a viscous fluid sealed in the internal cavity 24 of the housing 12. In addition, the damper housing 12 includes a first mounting lug 28 and a second mounting lug 30 to securely mount the damper housing 12 to the mounting boss 32 (see FIGS. 4 and 5) in a manner that will be described in greater detail below.

In the illustrated embodiment, the spring 22 comprises a coil spring. The spring 22 is concentrically received over the shaft 14 and, more particularly, the second exposed end 18 of that shaft. A first spring end 34 is engaged in a first slot or receiver 36 provided in the second exposed end 18 of the shaft 14 (i.e. split shaft).

Figure 4:
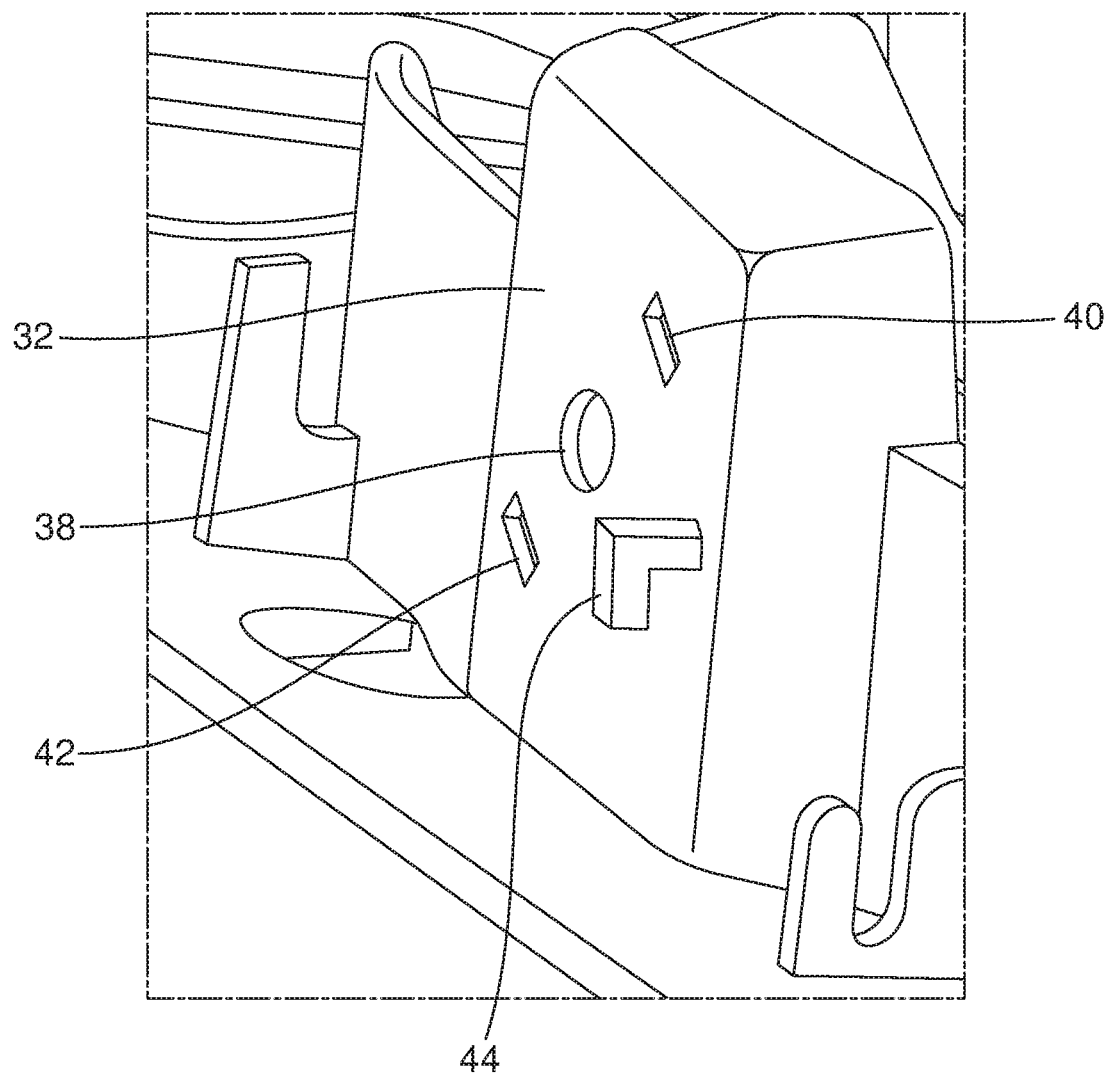
FIG. 4 is a detailed perspective view of the mounting boss of the viscous damper.
Figure 5:
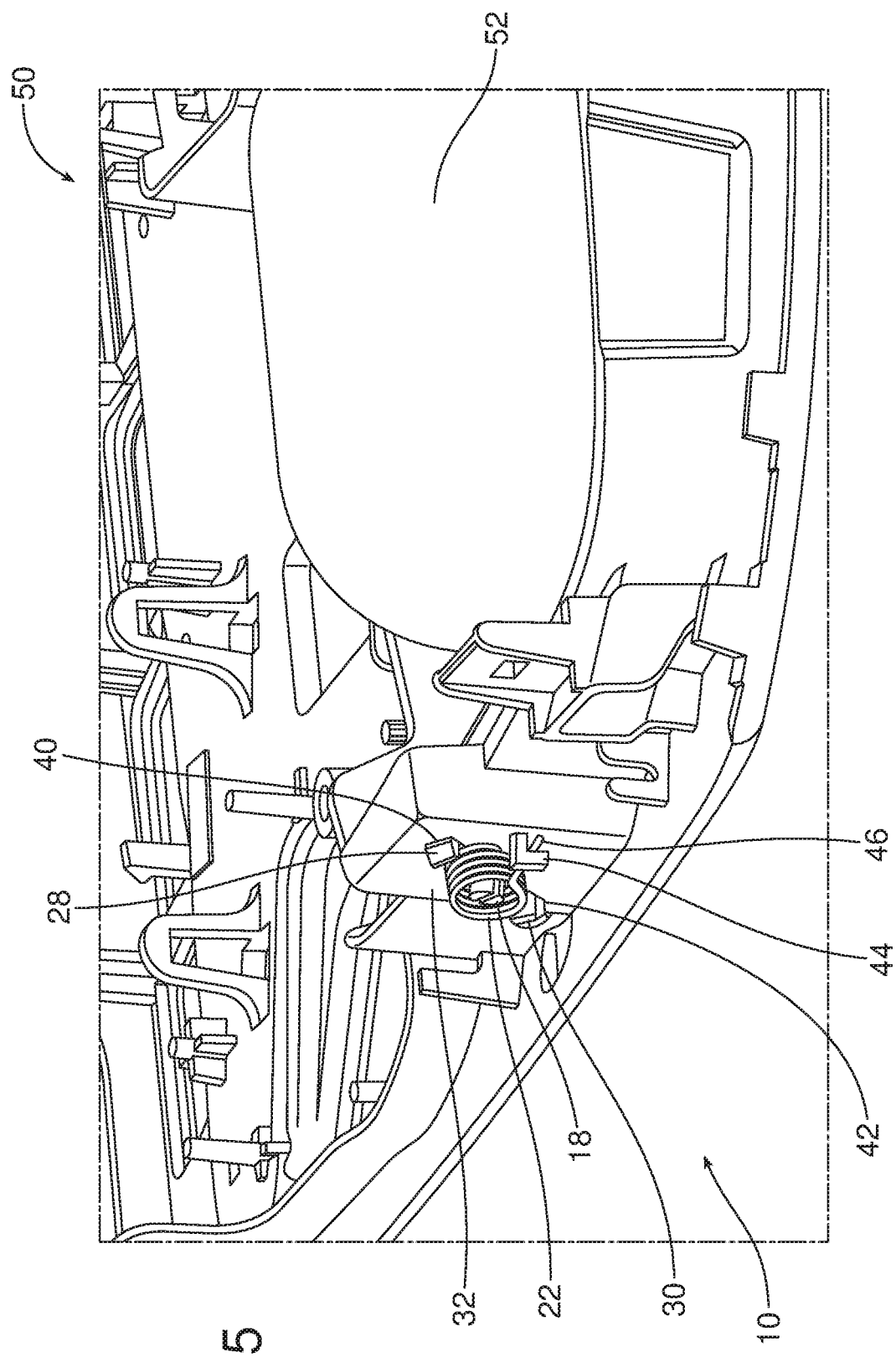
FIG. 5 is a perspective view of a storage bin including a pivoting door and the viscous damper.
Figure 6:
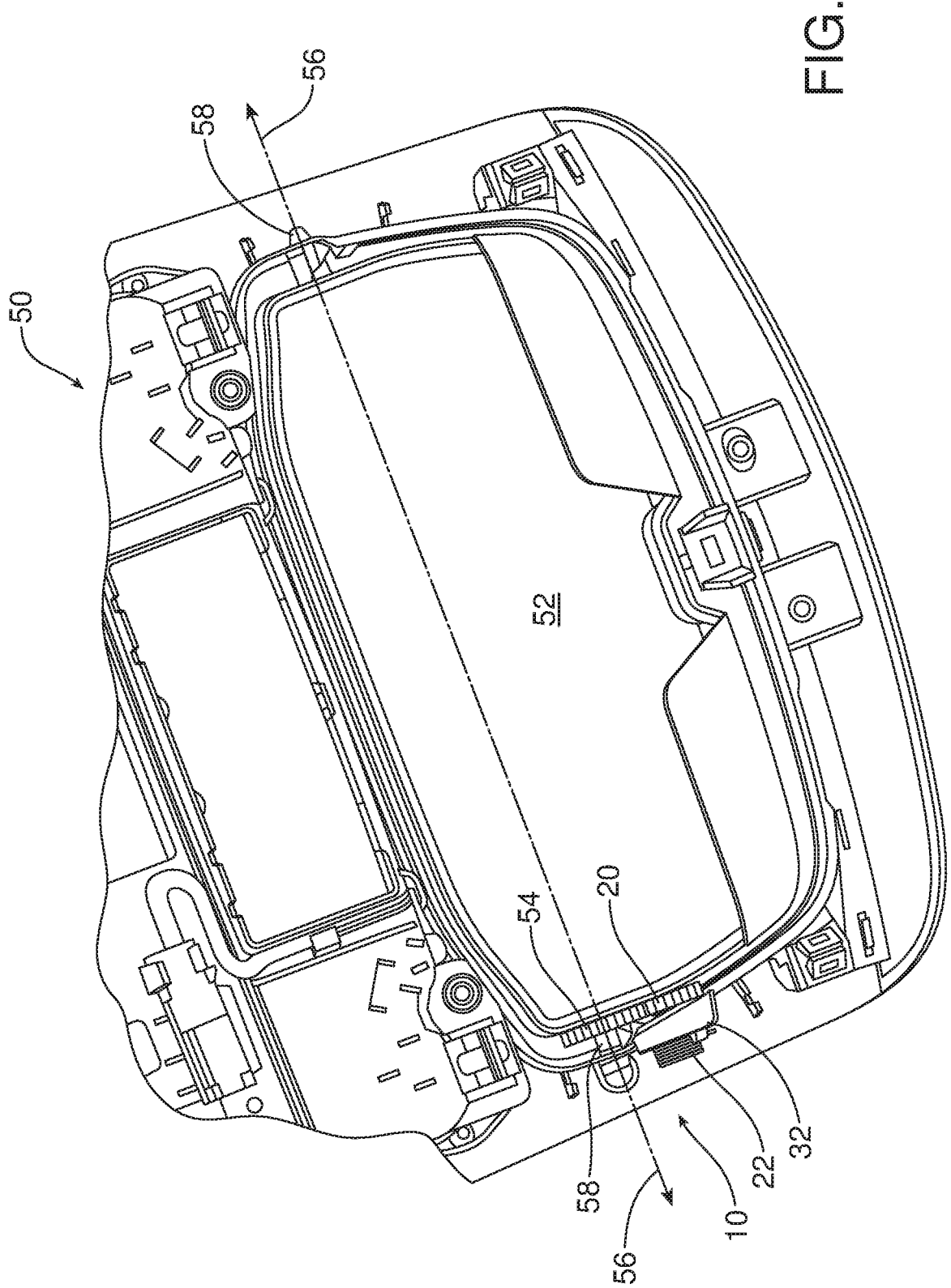
FIG. 6 is a detailed perspective view of the storage bin illustrating the second gear that is fixed to the door and aligned with a pivot axis for the door.

As best illustrated in FIG. 4, the mounting boss 32 includes an aperture or second receiver 38, a first abutment 40 surrounding a first mounting aperture and a second abutment 42 surrounding a second mounting aperture. When properly assembled as illustrated in FIG. 5 the second exposed end 18 of the shaft 14 extends through the second receiver 38. Further, the first mounting lug 28 is in engagement with the first abutment 40 and the second mounting lug 30 is in engagement with the second abutment 42 so that the damper housing 12 is securely fixed to the mounting boss 32.

As further shown in FIGS. 4 and 5, the mounting boss 32 also includes a spring retainer 44. When properly assembled, a second spring end 46 of the spring 22 is engaged with the spring retainer 44.

Reference is now made to FIGS. 5, 6, 7a and 7b clearly illustrating a storage bin 50 comprising a pivoting door 52 and the viscous damper 10 connected to that door.

More specifically, a second gear 54 is fixed to the door 52. The second gear 54 is aligned with and concentrically received around a pivot axis 56 for the door 52 defined by opposed pivot pins 58. When properly assembled, the second gear 54 meshes with the gear 20 of the viscous damper 10.

Figure 7A:
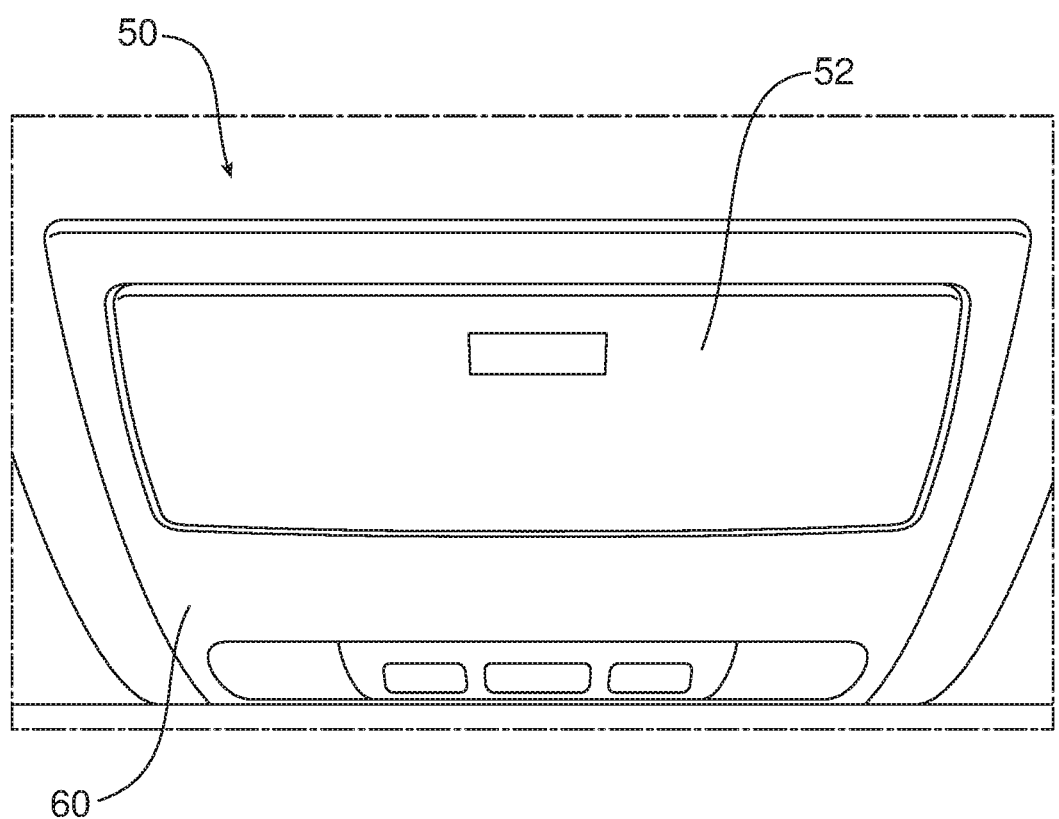
FIGS. 7a and 7b are respective perspective views illustrating the door of the storage bin in the closed position and the opened position.
Figure 7B:
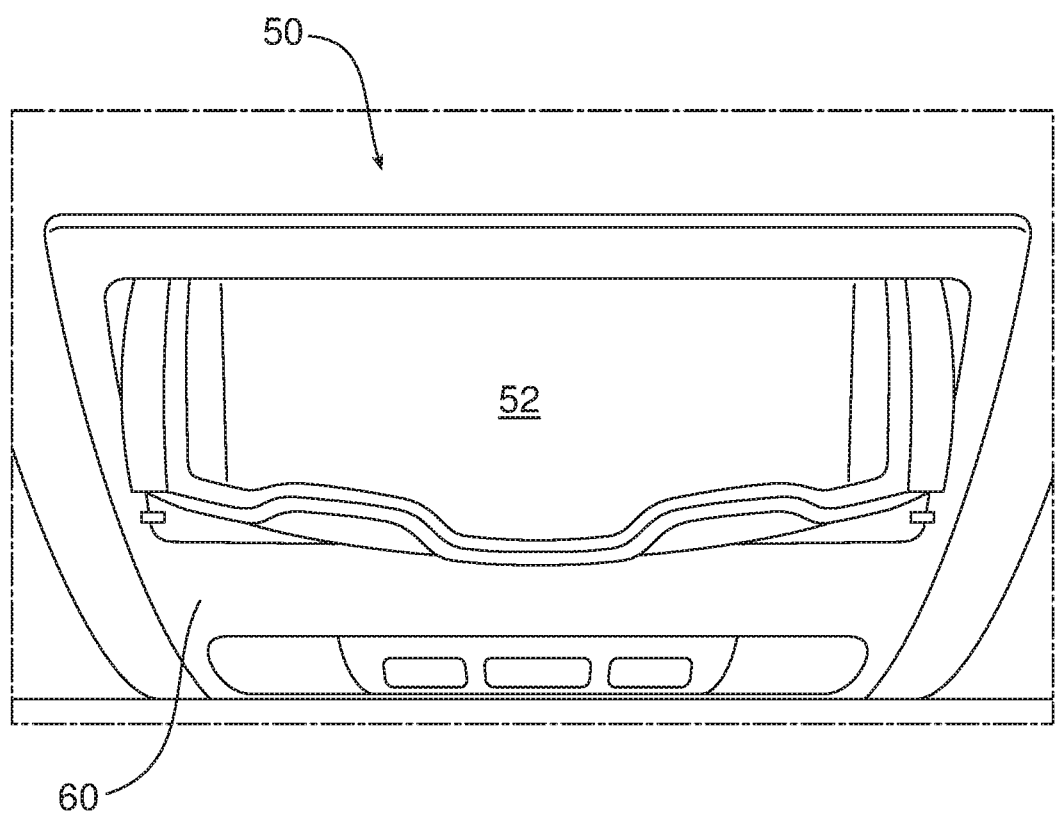

In the illustrated embodiment, the storage bin 50 comprises a sunglasses bin such as provided in the overhead trim 60 of a motor vehicle. One releases the door latch (not shown) and the spring 22 provides a rotary driving force to the gear 20 which meshes with the second gear 54 causing the door 52 to pivot open about the pivot axis 56. FIG. 7a illustrates the door 52 in the closed position while FIG. 7b illustrates the door 52 in the opened position. As the door 52 is biased open by the spring 22, the damping feature 26 in the damper housing 12 ensures smooth and consistent pivoting action. When one wishes to close the door 52 one simply engages the door and manually pivots the door back into the closed position where it is retained by the latch until that latch is released again by the operator. The latch may be a push-push latch of a type known in the art.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A viscous damper, comprising:
   a damper housing;
   a split shaft extending through said damper housing, said shaft including a first end exposed on a first side of the damper housing and a second end exposed on a second opposite side of the damper housing;
   a gear mated to said first end;
   a spring connected to said second end, wherein said spring is concentrically received over said split shaft and has a first spring end engaged in a first receiver in said second end of said shaft; and
   a mounting boss supporting said damper housing, wherein said mounting boss includes a second receiver through which said spring extends.

2. The viscous damper of claim 1, wherein said spring is a coil spring.

3. The viscous damper of claim 1, wherein said mounting boss include a first abutment and a second abutment and said damper housing includes a first mounting lug in engagement with said first abutment and a second mounting lug in engagement with said second abutment.

4. The viscous damper of claim 3, wherein said mounting boss includes a spring retainer and said coil spring includes a second spring end engaged with said spring retainer.

5. The viscous damper of claim 4, further including a damping feature in said damper housing.

6. A storage bin, comprising:
   a door;
   a viscous damper connected to said door, said viscous damper including (a) a damper housing, (b) a shaft extending through said damper housing, said shaft including a first end and a second end, wherein the first and second ends are exposed on opposite sides of the damper housing, (c) a gear mated to said first end and (d) a spring connected to said second end, wherein said spring is concentrically received over said shaft and has a first spring end engaged in a first receiver in said second end of said shaft; and
   a mounting boss supporting said damper housing, wherein said mounting boss includes a second receiver through which said spring extends.

7. The storage bin of claim 6, wherein said spring is a coil spring.

8. The storage bin of claim 6, wherein said mounting boss includes a first abutment and a second abutment and said damper housing includes a first mounting lug in engagement with said first abutment and a second mounting lug in engagement with said second abutment.

9. The storage bin of claim 8, wherein said mounting boss includes a spring retainer and said coil spring includes a second spring end engaged with said spring retainer.

10. The storage bin of claim 9, further including a damping feature in said damper housing.

11. The storage bin of claim 10, further including a second gear fixed to said door, said second gear being aligned with a pivot axis for said door and meshing with said gear mated to said first end of said shaft.

12. A viscous damper, comprising:
   a damper housing;
   a mounting boss supporting said damper housing;
   a shaft extending through said damper housing, said shaft including a first end exposed on a first side of the damper housing and a second end exposed on a second side of the damper housing;
   a gear mated to said first end; and
   a coil spring connected to said second end, wherein said coil spring is concentrically received over said shaft and has a first spring end engaged in a first receiver in said second exposed end of said shaft, and wherein said mounting boss includes a second receiver through which said coil spring extends.

\* \* \* \* \*